United States Patent Office 3,168,543
Patented Feb. 2, 1965

3,168,543
ORGANOSILOXANE-POLYOXYALKYLENE ETHER COPOLYMERS
William T. Black, White Plains, Donald L. Bailey, Snyder, and Victor B. Jex, Clarence, N.Y., assignors to Union Carbide Corporation, a corporation of New York
No Drawing. Filed Oct. 10, 1960, Ser. No. 61,356
13 Claims. (Cl. 260—448.2)

This invention relates generally to novel organosiloxane-polyoxyalkylene ether compounds and to processes for making them. More particularly, it is concerned with organosiloxane-polyoxyalkylene ether copolymers wherein the polyoxyalkylene ether is interconnected to an organosiloxane unit through an ester linkage and to processes for producing the same.

The novel organosiloxane-polyalkylene ether copolymers of this invention are those containing a polyoxyalkylene ether portion which is interconnected to an organosiloxane chain through an ester linkage, the ester linkage being interconnected to a silicon of the organosiloxane chain through an alkylene group containing at least 2 carbon atoms.

The novel organosiloxane-polyoxyalkylene ether copolymers of this invention are produced by the reaction of an organosiloxane containing at least 2 silicon atoms interconnected by a siloxane linkage, at least one silicon atom containing a silicon-bonded carboxyalkyl group, carboalkoxyalkyl group or haloacylalkyl group with a polyoxyalkylene ether having at least one terminal hydroxyl group under such conditions as to cause esterification of such carboxylalkyl group, carboalkoxyalkyl or haloacylalkyl to produce a copolymer containing polyoxyalkylene ether groups interconnected to the organosiloxane through an ester linkage.

It is obvious that the structure of the product and the exact unit structure will be dependent on the particular starting materials employed to prepare the organosiloxane-polyoxyalkylene ether copolymers. Thus for example, when a polyoxyalkylene ether terminated at one end with a hydroxyl group and at the other with a monovalent hydrocarbon group through an ether linkage is reacted with an organopolysiloxane containing at least one terminal or pendant silicon-bonded carboxyalkyl group, carboalkoxyalkyl group or haloacylalkyl group, a product is produced which contains at least one polyoxyalkylene ether portion which is linked at one end to an organosiloxane portion through an ester linkage and which is linked at the other end to a monovalent hydrocarbon radical through an ether linkage. On the other hand, when the polyoxyalkylene ether is terminated at each end with a hydroxyl group two types of products can be produced. The first type of product is a product which contains at least one polyoxyalkylene ether portion which is linked at one end to an organosiloxane portion through an ester linkage and which is terminated at the other end to a hydroxyl group. The second type of copolymer is one in which each end of the polyoxyalkylene ether is linked to an organosiloxane portion through an ester linkage.

The siloxane portion of the organosiloxane-polyoxyalkylene ether copolymers of this invention is a polysiloxane which contains at least two silicon atoms interconnected through a siloxane linkage, at least one silicon atom thereof being in a unit of the formula:

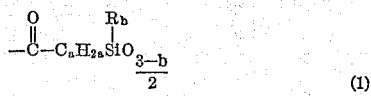

(1)

where R is a monovalent hydrocarbon radical or a halogenated monovalent hydrocarbon radical, (a) is an integer of from 2 to 10 and (b) is an integer of from 0 to 2. The unsatisfied valence of the acyl carbon atom is attached through an oxygen linkage to a polyoxyalkylene ether. The siloxane can consist entirely of units of Formula 1 or it can consist of one or more units of Formula 1 and one or more units of the formula:

(2)

where R is as above defined, R'' is a monovalent hydrocarbon radical, a halogenated monovalent hydrocarbon radicals, a carboxyalkyl group or a carboalkoxyalkyl group and (c) is an integer of from 0 to 2. By the terms "carboxyalkyl" and "carboalkoxyalkyl," as used herein, is meant HOOC—$C_a$—$H_{2a}$— and R °OOC$C_aH_{2a}$— groups respectively, where (a) is defined as above and R° is an alkyl group such as methyl, ethyl, propyl, hexyl and the like.

More particularly the siloxane portion of the organosiloxane-polyoxyalkylene ether copolymers of this invention contain from 0.1 to 100 mole percent units of Formula 1 and from 0 to 99.9 mole percent units of Formula 2.

Illustrative of the monovalent hydrocarbon radicals represented by R and R'' are the aliphatic radicals (e.g. the methyl, ethyl and octadecyl radicals), the cycloaliphatic radicals (e.g. the cyclohexyl and the cyclopentyl radicals), the aryl radicals (e.g. the phenyl, tolyl, xenyl and naphthyl radicals), the aralkyl radicals (e.g. the benzyl and beta-phenylethyl radicals), the unsaturated aliphatic radicals (e.g. the vinyl, allyl and hexenyl radicals) and the unsaturated cycloaliphatic radicals (e.g. the cyclohexenyl radical). Illustrative of the halogenated monovalent hydrocarbon radicals represented by R are the halogenated alkyl radicals (e.g. the chloromethyl, gamma-chloropropyl and tetrafluoroethyl radicals), the halogenated alkenyl radicals (e.g. the trifluorovinyl and chlorodifluorovinyl radicals) and the halogenated aryl radicals (e.g. the alpha, alpha-trifluorotolyl, bromophenyl and tetrabromoxenyl radicals).

The polyoxyalkylene ether portion of the organosiloxane-polyoxyalkylene ether copolymers of this invention is a linear, predominantly oxyalkylene polymer or chain comprised for the most part of recurring oxyalkylene groups, which groups can be represented by the general formula:

$$—(C_nH_{2n}O)_x—$$  (3)

in which (n) is an integer of from 2 to 8, preferably n is an integer of from 2 to 4 and (x) is an integer of at least 5. Thus a polyoxyalkylene wherein (x) is 5 and (n) is 2 throughout the chain has a molecular weight of 220 which is the minimum molecular weight attributable to such chain. Polyoxyalkylene ethers of a molecular weight up to about 10,000 or higher can be used. A molecular weight of from about 500 to 6000 is preferred, however. The oxyalkylene group need not be the same through the chain and can comprise oxyalkylene groups of differing structures and/or molecular weights such as oxyethylene; oxy-1,2-propylene; oxy-1,3-propylene; the oxybutylenes and the oxyoctylenes, and the oxyethylene-oxypropylene copolymers, oxypropylene-oxybutylene copolymers and the like.

Thus the organosiloxane-polyoxyalkylene ether copolymers of this inventon include the two classes of copolymers which have the general formulas:

(A)

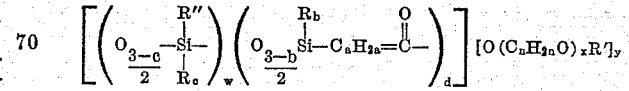

and (B)

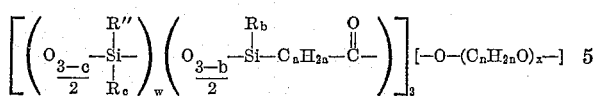

where R, R'', $(a)$, $(b)$ and $(c)$ are as above-defined, R' is a hydrogen, an alkyl group, an aryl group or an alkoxyaryl group, $(d)$ is an integer of at least 1, $(w)$ is an integer of 0, 1 or higher, the sum of $d$ and $w$ being at least 2, $(n)$ is an integer of from 2 to 8 denoting the number of carbon atoms in the oxyalkylene group, $(x)$ is an integer having a value of at least 5 and denotes the length of the oxyalkylene chain and $(y)$ is an integer having a value equal to $d$.

Illustrative of the groups that are represented by R' are alkyl groups such as methyl, ethyl, propyl, butyl, octadecyl and the like; aryl groups such as, phenyl, tolyl, xylyl and the like and alkoxyaryl groups such as methoxyphenyl, ethoxyphenyl, butoxyphenyl, methoxyxylyl, nonoxyphenyl and the like.

With reference to Formulae A and B above, there is at least one polyoxyalkylene chain interconnected to an organosiloxane chain through an ester linkage in which the acyl carbon atom is interconnected to silicon of the siloxane chain through an alkylene chain of at least 2 carbon atoms.

The copolymers as shown by Formula A above are those wherein each polyoxyalkylene ether group is bonded through an ester linkage to a single acylalkyl group which is bonded to a silicon atom of a siloxane chain and is bonded through an oxygen atom to a hydrogen atom or to an alkyl, aryl or alkoxyaryl group (i.e. to an atom or group denoted by R').

One type of copolymer represented by Formula A has the formula:

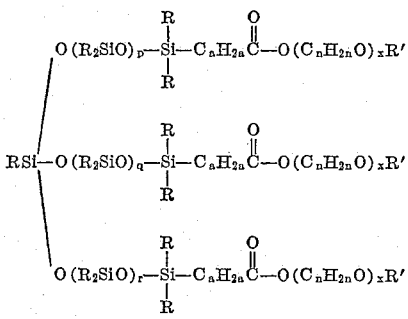

where R, R', $(a)$, $(x)$ and $(n)$ have the above-defined meanings and where $p$, $q$ and $r$ are integers of 0, 1 or higher.

A second type of copolymer represented by Formula A has the formula:

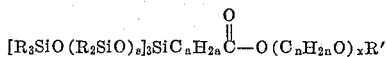

where R, R', $(a)$, $(n)$ and $(x)$ are as above-defined and $(s)$ is an integer of 0, 1 or higher.

A third type of copolymer represented by Formula A are those of the formula:

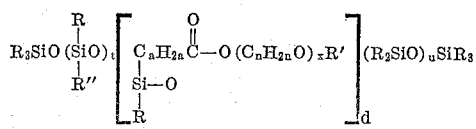

where R, R', R'', $(a)$, $(d)$ and $(x)$ are as above-defined and $t$ and $u$ are integers of 0, 1 or higher.

A fourth type of polymer represented by Formula A are the cyclic copolymers having the formula:

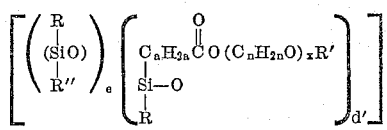

where R, R', R'', $(a)$, $(n)$ and $(x)$ are as above-defined, $d'$ is an integer of from 1 to 5, $e$ is an integer of from 0 to 4 the sum of $(d'+e)$ being 3, 4 or 5.

A fifth type of polymer represented by Formula A are those of the formula:

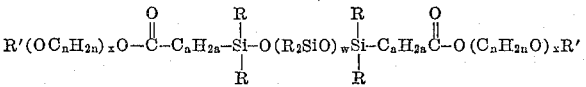

wherein R, R', $(a)$, $(n)$, $(w)$ and $(x)$ are as above-defined.

The copolymers as shown by Formula B above are those wherein each polyoxyalkylene ether group is bonded through oxygen linkages to two acylalkyl groups each of which is bonded to a silicon atom of a siloxane chain.

One type of copolymer represented by Formula B has the formula:

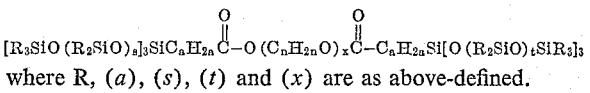

where R, $(a)$, $(s)$, $(t)$ and $(x)$ are as above-defined.

A second type of copolymer represented by Formula B has the formula:

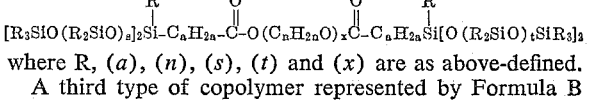

where R, $(a)$, $(n)$, $(s)$, $(t)$ and $(x)$ are as above-defined.

A third type of copolymer represented by Formula B has the formula:

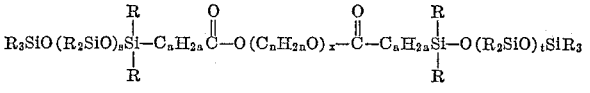

where R, $(a)$, $(n)$, $(s)$, $(t)$ and $(x)$ are as above-defined.

The novel organosiloxane-polyoxyalkylene ether copolymers are produced by the reaction of a linear polyoxyalkylene ether containing at least one terminal hydroxyl group, that is polyoxyalkylene ethers of the formula:

$$HO(C_nH_{2n}O)_xR' \qquad (4)$$

where R', $(n)$ and $(x)$ are as above-defined, with an organosiloxane containing at least 2 silicon atoms interconnected by a siloxane linkage, at least one silicon atom having a carboxyalkyl, carboalkoxyalkyl or a haloacylalkyl group bonded thereto, that is an organosiloxane containing at least 2 silicon atoms and composed essentially of units of the formula:

and

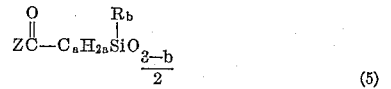

wherein R, R'', $(a)$, $(b)$ and $(c)$ are as above-defined and Z is a hydroxyl group, an alkoxy group or halogen. The reaction being conducted under such conditions as to cause the reaction of the polyoxyalkylene ether and the Z group of organosiloxane to form an ester group. The reaction is conducted by forming an admixture of a suitable polyoxyalkylene ether with a suitable organosiloxane as above-described and maintaining said admixture at a temperature at which the (Z—) group of the organosiloxane and the polyoxyalkylene ether react to produce the novel organosiloxane-polyoxyalkylene ether copolymers of this invention.

When Z represents an alkoxy or hydroxy group in Formula 5, the reaction is conducted in the presence of an esterification or transesterification catalyst, for example, strong acids such as hydrochloric acid, sulfuric acid, trifluoroacetic acid, heptafluorobutyric acid, perfluorogutaric acid, paratoluene sulfonic acid and the like. It is preferred to employ the perfluoro acids as the catalyst since acids such as hydrochloric and sulfuric may cause rearrangement of the siloxane bonds.

When Z in Formula 5 is halogen no catalyst is needed; however, a hydrogen halide acceptor can be employed to react with the hydrogen halide liberated and prevent undesirable side reactions such as redistribution of the siloxane bonds. Such hydrogen halide acceptors are, for example, tertiary amines, such as the tri-alkyl amines such as tri-ethylamine, tri-n-butylamine and the like; and heterocyclic amines containing a tertiary nitrogen atom for example pyridine, morpholine, quinoline and the like.

While it is not always necessary to use a solvent in order to produce the compositions of this invention, it is preferred to employ a solvent to facilitate the reaction of the starting materials of this invention and to provide a means whereby the by-products (water, alcohol or amine salts) may be readily removed. A solvent is particularly desirable in those instances where the starting organosiloxane and polyoxyalkylene ether are incompatible. Solvents that are useful in the process of this invention are those which are inert toward the starting materials employed and the products produced. Such solvents are for example, liquid aromatic hydrocarbons such as benzene, toluene, xylene and the like, the dialkyl ethers such as diethylether, diisopropyl ether and the like; and the dialkylethers of ethylene glycol and polyethylene glycols such as the dimethyl ethers of ethylene glycol, the diethyl ethers of diethylene glycol $(C_2H_5OC_2H_4OC_2H_4OC_2H_5)$, the dibutyl ether of triethylene glycol

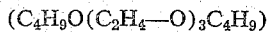

and the like.

Solvents such as benzene, toluene and xylene are particularly useful where water is a by-product of the reaction, since the water is readily removed from the reaction mixture by azeotropic distillation, thereby driving the reaction to completion.

The temperature at which the reaction is conducted is not narrowly critical and can be from about 0° C. to 200° C. When Z in the starting organosiloxane is halogen it is preferred that the temperature be maintained at from about 25° C. to about 100° C. When Z in the organosiloxane is an alkoxy or hydroxyl group, temperatures of from about 75° C. to about 150° C. are preferred in order that the reaction take place at a reasonable rate.

The amount of the reactants employed in the preparation of the organosiloxane-polyoxyalkylene ether copolymers of this invention is dependent upon the particular copolymer which it is desired to produce. Thus, for example, when it is desired to produce organosiloxane-polyoxyalkylene copolymers containing residual carboalkoxyalkyl or carboxyalkyl groups bonded to the siloxane chain, the amount of the polyoxyalkylene ether employed should be such that there is, in the reaction mixture, less than one hydroxyl group of the polyoxyalkylene ether for each acylalkyl group of the starting organosilane. When it is desired to produce organosiloxane-polyoxyalkylene ether copolymers wherein the oxyalkylene ether is terminated with a hydroxyl group it is necessary to employ at least one mole of a polyoxyalkylene ether terminated at each end with a hydroxyl group for each equivalent of the acylalkyl group present in the starting organosiloxane.

When it is desired to produce the organosiloxane-polyoxyalkylene copolymers represented by Formula B above it is necessary to employ at least about two moles of the acylalkylsiloxane for each mole of a polyoxyalkylene ether which is terminated at each end with a hydroxyl group.

The organosiloxane compounds which are useful as starting materials in the production of the compositions of the instant invention are those containing at least two silicon atoms interconnected by siloxane linkage at least one unit being of the formula:

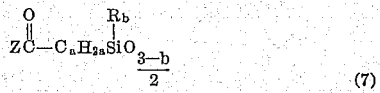
(7)

where R, Z (a) and (b) have the above-defined meanings and the silicon atom is interconnected to the acyl group through at least two carbon atoms. More particularly the organosiloxanes that are useful as a starting material in the production of the organosiloxane-polyoxyalkylene ether copolymers of this invention are those containing from 0.1 to 100 mole percent units of the formula:

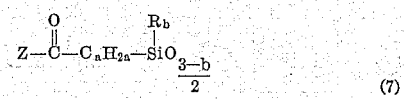
(7)

and from 0 to 99.9 mole percent units of the formula:

(8)

wherein R, R'', Z, (a), (b) and (c) have the above-defined meanings.

The organosiloxanes useful as starting materials in the process of this invention include those containing only units of Formula 7 and those containing units of Formula 7 and units of Formula 8.

The organosiloxanes containing only units of Formula 7 can be trifunctional with respect to silicon (i.e. where $b=0$), examples of such trifunctional organoalkylsiloxanes are, beta-carboxyethylpolysiloxane, beta-carboxypropylsiloxane, gamma-carboxypropylpolysiloxane, omega-carboxydecylpolysiloxane, and the like and the acid halides and alkoxy esters thereof. These organosiloxane starting materials can be difunctional with respect to silicon (i.e. where $b=1$) which can be cyclic in form having from 3 to 7 such units or which can be linear having at least 2 of such units. For example, such cyclic organosiloxanes include tetra(gamma-carboxypropyl)tetramethylcyclotetrasiloxane, tri(beta-carboxypropyl)triethylcyclotrisiloxane, tetra-(beta-carboxyethyl)tetraphenylcyclotetrasiloxane and the like, as well as the acid halides and alkoxy esters thereof. Typical of the linear organosiloxanes are the end-blocked organopolysiloxane oils, for example, gamma - carboxypropylethylpolysiloxane oils, beta - carboxypropylphenylpolysiloxane oils, beta - carboxyethylmethylpolysiloxane oils and the like, as well as the acid halides and alkoxy esters thereof. These organosiloxane starting materials also include those which are monofunctional with respect to silicon (i.e. where $b=2$) such as, for example, bis(gamma - carboxypropyl)tetramethyldisiloxane; bis(beta - carboxypropyl)tetraphenyldisiloxane and the like as well as the acid chlorides and alkoxy esters thereof. The starting organosiloxanes can include polymers containing combinations of mono-, di- and trifunctional units.

Other organosiloxane compounds useful as starting materials in the process of this invention are those containing, in addition to one or more units as depicted by Formula 7, one or more units of Formula 8.

Thus for example, these organosiloxanes include compounds containing difunctional units of Formula 7 with mono-, and difunctional units of Formula 8, i.e. organosiloxanes of the formula:

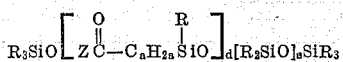

where R, Z, (a), (d) and (s) are defined as above and the like.

The polyoxyalkylene ethers containing at least one terminal hydroxyl group, which are useful in the production of the acylalkylsiloxane-polyoxyalkylene ether copolymers of this invention are those having the general formula:

$$HO(C_nH_{2n}O)_xR'$$

where R', (n) and (x) are as previously defined.

The polyoxyalkylene ethers containing at least one terminal hydroxyl group which are useful in the production of the compounds of this invention are commonly produced by the polymerization of an alkylene oxide having terminal epoxy groups, such as ethylene oxide, propylene oxide, butylene oxide and the like, with an aliphatic or aromatic compound having at least one primary hydroxyl group but which may contain one or more secondary hydroxyl groups. Such compounds as may be used to prepare these hydroxy-ended polyoxyalkylene ethers are methanol, ethanol, butanol, pentanol, phenol, ethoxy phenol and like mono-hydroxy compounds and ethylene glycol, propylene glycol, glycerol, diethylene glycol, sorbitol and like polyhydroxy compounds.

Preferred in the reaction with the organosiloxanes are the linear chain hydroxy-ended polyoxyalkylene ether represented by the general formula:

$$HO(C_nH_{2n}O)_xR'$$

wherein R', x and (n) are as above-defined, such linear chain hydroxy-ended polyoxyalkylene ether containing at least one primary hydroxyl group.

Since these hydroxy-ended polyoxylalkylene ethers are prepared by a polymerization of the alkylene oxides, they are composed of a mixture of hydroxy-ended polyoxyalkylene ethers of various molecular weights, to which mixtures have been assigned an average molecular weight. The determination of the average molecular weight assigned to these mixtures is ascertained by known methods of determining physical and chemical properties.

The novel organosiloxane-polyoxyalkylene ether copolymers of this invention are useful as lubricants for steel on steel.

This application is a continuation-in-part of application Serial No. 615,468, filed October 12, 1956 and which issued as U.S. 2,957,899 on October 25, 1960.

The following examples serve to illustrate the invention:

EXAMPLE 1

*Preparation of the acyl chloride of gamma-carboxypropylmethylpolysiloxane*

Gamma-carboxypropylmethylsiloxane cyclic tetramer in amount 30 grams, was placed in a one-liter flask fitted with a reflux condenser, together with 100 cubic centimeters of toluene and 24.5 grams (0.206 mole, 300% excess) of thionyl chloride. The mixture was heated on a steam bath for four (4) hours. The solvent and excess thionyl chloride was then stripped off under vacuum. The residue material was a free-flowing oil. Infra-red analysis of the material indicated that no OH groups were present and a shift in the absorption bond of the carbonyl group corresponded to that for the acid chloride. A subsequent repeat experiment yielded ninety-five percent (95%) of the theoretical. Elemental analysis of the compound gave the following results:

|  | C, percent | H, percent | Si, percent | Cl, percent | Saponification Number |
|---|---|---|---|---|---|
| Calculated | 36.5 | 5.5 | 17.0 | 21.6 | 682 |
| Found | 35.5 | 5.9 | 17.0 | 21.7 | 698 |

EXAMPLE 2

*Esterification of gamma-carboxypropylmethylsiloxane cyclic acid chloride*

The acid chloride of gamma-carboxypropylmethylsiloxane cyclic as prepared in Example 1, 27 grams, was reacted with 50 grams of a butoxypolypropylene glycol, $C_4H_9O(C_3H_6O)_xH$, of approximately 300 molecular weight. The reaction was effected by heating a solution of the above materials in 100 cubic centimeters of toluene in a one-liter flask on a steam bath for three hours. There was a nitrogen sparge for the last hour. The solution was then refluxed for an additional two hours. The toluene was then removed by vacuum evaporation yielding 64.7 grams of an oil having a viscosity of 73.0 centistokes at 25° C. and which contained units of the formula:

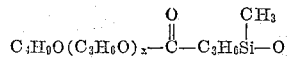

The oil was tested for load-carrying ability in accordance with the falex test described by L. B. Sargent et al. in their article entitled "Laboratory Evaluation of E.P. Gear Oils," Lubricating Engineering, vol. 5, October 1949. The failure load was 1100 pounds which indicates a high degree of lubricity.

EXAMPLE 3

*Esterification of gamma-carboxypropylmethylsiloxane cyclic tetramer*

Gamma-carboxypropylmethylsiloxane cyclic tetramer in amount 43.8 grams, a butoxy polypropylene glycol of about 300 molecular weight containing a terminal OH group, in amount 108 grams (20% excess), 2.0 grams of trifluoroacetic acid, and 400 cubic centimeters of toluene were charged into a one-liter flask fitted with a Dean-Stark moisture trap and refluxed at 120° C. for 24 hours. At the end of this time, the trifluoroacetic acid was neutralized and the material stripped under vacuum. The residue was an oil and weighed 81 grams representing a 66 percent yield. The oil had a viscosity of 28 centistokes at 25° C. and contained gamma-carbo(butoxypolypropyleneoxy)propylmethylsiloxane units.

EXAMPLE 4

A reaction vessel was charged with 87.5 grams of dimethyl-silicone oil modified with 10 weight percent gamma-carboxypropylmethylsiloxy groups having the average formula:

$$(CH_3)_3SiO[(CH_3)_2SiO]_{58.4}$$
$$[HOOCC_3H_6Si(CH_3)O]_{3.5}Si(CH_3)_3$$

and a viscosity of 285.1 centistokes at 25° C., 135 grams of a polyoxypropylene ether of approximately 2450 average molecular weight having the average formula $$C_4H_9O(C_3H_6O)_{41}-H$$

200 cc. of toluene and 1 gram of trifluoroacetic acid. The reaction vessel was fitted with a Dean-Stark moisture trap and a reflux condenser. The mixture was heated to reflux (about 110° C.) for 7 hours during which time 1.0 cc. of water collected in the Dean-Stark moisture trap. The toluene was then removed by vacuum evaporation at 150° C. There resulted an oil having a viscosity of 1772 centistokes at 25° C. The presence of gamma-carbo (butoxypolypropyleneoxy)propylmethylsiloxy groups in the oil was confirmed by infrared analysis.

EXAMPLE 5

A dimethylsilicone oil (96.5 g.) modified with gamma-carboxypropylmethylsiloxane units and having the average formula:

$$(CH_3)_3SiO[(CH_3)_2SiO]_7$$
$$[HOOCC_3H_6Si(CH_3)-O-]_3Si(CH_3)_3$$

toluene (200 cc.), trifluoroacetic acid (1.0 g.) and 300 grams of a polyoxypropylene ether of the average formula $C_4H_9O(C_3H_6O)_{16}$—H were charged into a reaction vessel fitted with a Dean-Stark moisture trap and a reflux condenser. The mixture was then heated to reflux (about 110° C.) to remove the water formed by the reaction of the carboxy group in the silicone oil and the polyoxypropylene ether to form an ester group. The toluene was then removed by vacuum evaporation at 150° C. A light brown oil having a viscosity of 305 cps. at 25° C. resulted. The oil was a polysiloxane oil containing units of the formula:

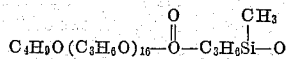

EXAMPLE 6

A dimethylsilicone oil (103.4 g.) modified with beta-carboxyethylmethylsiloxy units and having the average formula

[HOOCC$_2$H$_4$Si(CH$_3$)O]Si(CH$_3$)$_3$ is reacted with a hydroxy-ended polyoxyethylene ether having the average formula HO(C$_2$H$_4$—O)$_{20}$H (124 g.) employing trifluoroacetic acid as the esterification catalyst and xylene as the solvent according to the procedure of Example 3. There is obtained a copolymer having the average formula:

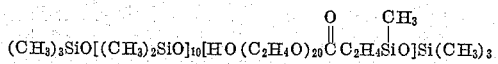

The copolymer is useful as a lubricant for steel on steel surfaces.

EXAMPLE 7

A dimethylsilicone oil (177.7 g.) modified with beta-carbethoxypropylmethylsiloxy units and having the average formula:

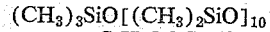

is mixed with 125.2 grams of a polyoxypropylene ether having the average formula:

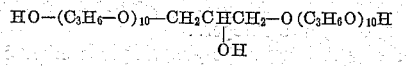

and 2.0 grams of perfluoroglutaric acid. The mixture is heated to 100° C. for 16 hours during which time ethanol is removed by distillation. There is produced a copolymer containing units of the formula:

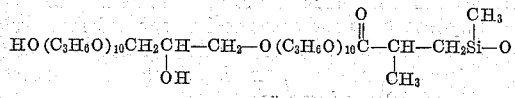

This copolymer is useful as a lubricant for steel on steel.

EXAMPLE 8

A carboxyalkylsiloxy modified dimethylsilicone oil (260.2 g.) having the average formula:

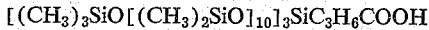

is reacted with 89.8 grams of a polyoxyethylene ether having the average formula HO(C$_2$H$_4$—O)$_{20}$H employing toluene as a solvent and perfluoroglutaric acid as an esterification catalyst according to the procedure of Example 5 to yield an organosiloxane-polyoxyethylene ether composition comprising a mixture of copolymers which have the average formulas:

(1)
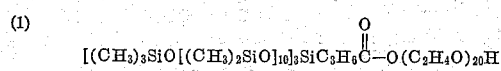

and (2)
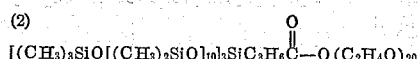
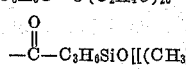

EXAMPLE 9

A carboxyalkylsiloxy modified dimethylsilicone oil (67.6 g.) having the average formula:

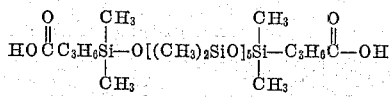

is reacted with 88.8 grams of a polyoxypropylene ether having the average formula HO(C$_3$H$_6$O)$_{15}$H, employing toluene as a solvent and trifluoroacetic acid as an esterification catalyst according to the procedure of Example 5 to produce an organosiloxanepolyoxypropylene ether composition comprising a mixture of copolymers, which have the average formulas:

(1)
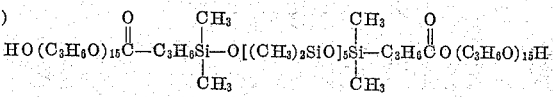

and (2)
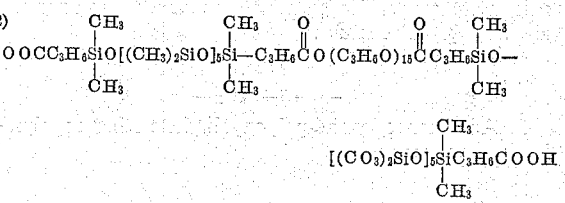

These copolymers are useful as lubricants for steel on steel.

What is claimed is:
1. A copolymer of (A) a copolymeric organosiloxane, said organosiloxane comprising both units of the formula:

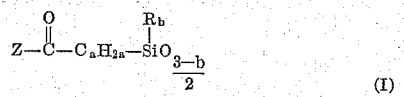

and units of the formula:

wherein R is a member of the class consisting of monovalent hydrocarbon radicals and halogenated monovalent hydrocarbon radicals, R'' is a member of the class consisting of monovalent hydrocarbon radicals, halogenated monovalent hydrocarbon radicals, carboxyalkyl radicals and carboalkoxyalkyl radicals, Z is a member of the class consisting of hydroxyl groups, halogen and alkoxy groups, (a) is an integer of from 2 to 10, (b) is an integer of from 0 to 2 and (c) is an integer of from 0 to 2, said copolymeric organosiloxane containing at least 0.1 mol percent of units represented by Formula I above and up to 99.9 mol percent of units represented by Formula II above, and (B) a polyoxyalkylene ether of the formula:

$$HO(C_nH_{2n}O)_xR'$$

wherein R' is a member of the class consisting of hydrogen, alkyl, aryl and alkoxyaryl groups, (n) is an integer of from 2 to 8 and (x) is an integer of at least 5, wherein a carbon atom of said polyoxyalkylene ether is interconnected to a silicon atom of said organosiloxane through an ester linkage having the formula

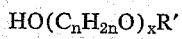

2. A copolymer of (A) an organosiloxane, said organosiloxane comprising from 0.1 to 100 mole percent units of the formula:

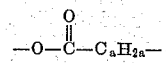
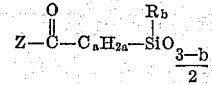

and from 0 to 99.9 mole percent units of the formula:

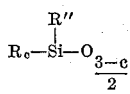

wherein R is a member of the class consisting of monovalent hydrocarbon radicals and halogenated monovalent hydrocarbon radicals, R'' is a member of the class consisting of monovalent hydrocarbon radicals, halogenated monovalent hydrocarbon radicals, carboxyalkyl radicals and carboalkoxyalkyl radicals, Z is a member of the class consisting of hydroxyl groups, halogen and alkoxy groups, $(a)$ is an integer of from 2 to 10, $(b)$ is an integer of from 0 to 2 and $(c)$ is an integer of from 0 to 2, and (B) a polyoxyalkylene ether of the formula:

$$HO(C_nH_{2n}O)_xR'$$

wherein R' is an alkyl group, $(n)$ is an integer of from 2 to 8 and $(x)$ is an integer of at least 5, wherein a carbon atom of said polyoxyalkylene ether is interconnected to a silicon atom of said organosiloxane through an ester linkage having the formula:

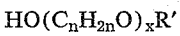

3. An organosiloxane-polyoxyalkylene ether copolymer having the formula:

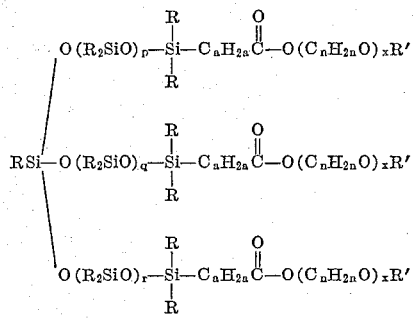

wherein R is a member of the class consisting of monovalent hydrocarbon radicals, R' is a member of the class containing hydrogen, alkyl groups, aryl groups and alkoxyaryl groups, $(a)$ is an integer of from 2 to 10, $(n)$ is an integer of from 2 to 8, $(x)$ is an integer of at least 5 and $(p)$, $(q)$ and $(r)$ are integers.

4. An organosiloxane-polyoxyalkylene ether copolymer having the formula:

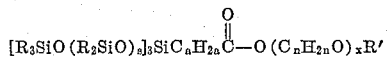

wherein R is a member of the class consisting of monovalent hydrocarbon radicals and halogenated monovalent hydrocarbon radicals, R' is a member of the class consisting of hydrogen, alkyl groups, aryl groups and alkoxyaryl groups, $(a)$ is an integer from 2 to 10, $(n)$ is an integer from 2 to 8, $(x)$ is an integer of at least 5 and $(s)$ is an integer.

5. An organosiloxane-polyoxyalkylene ether copolymer having the formula:

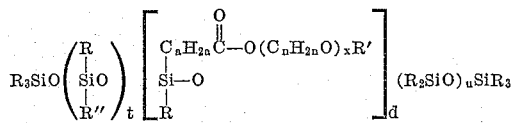

wherein R is a member of the class consisting of monovalent hydrocarbon radicals and halogenated monovalent hydrocarbon radicals, R' is a member of the class consisting of hydrogen, alkyl groups, aryl groups and alkoxyaryl groups, R'' is a member of the class consisting of monovalent hydrocarbon radicals, halogenated monovalent hydrocarbon radicals, carboxyalkyl radicals and carboalkoxyalkyl radicals, $(a)$ is an integer from 2 to 10, $(n)$ is an integer from 2 to 8, $(x)$ is an integer of at least 5, $(d)$ is an integer of at least 1 and $(t)$ and $(u)$ are integers.

6. An organosiloxane-polyoxyalkylene ether copolymer having the formula:

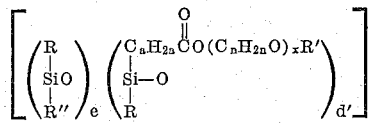

wherein R is a member of the class consisting of monovalent hydrocarbon radicals and halogenated monovalent hydrocarbon radicals, R' is a member of the class consisting of hydrogen, alkyl groups, aryl groups and alkoxyaryl groups, R'' is a member of the class consisting of monovalent hydrocarbon radicals, halogenated monovalent hydrocarbon radicals, carboxyalkyl radicals and carboalkoxyalkyl radicals, $(a)$ is an integer from 2 to 10, $(n)$ is an integer from 2 to 8, $(x)$ is an integer of at least 5, $(d')$ is an integer from 1 to 5, $(e)$ is an integer of from 0 to 4 the sum of $(d'+e)$ being from 3 to 5 inclusive.

7. An organosiloxane-polyoxyalkylene ether copolymer having the formula:

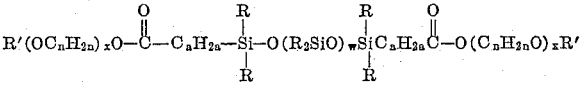

wherein R is a member of the class consisting of monovalent hydrocarbon radicals and halogenated monovalent hydrocarbon radicals, R' is a member of the class consisting of hydrogen, alkyl groups, aryl groups and alkoxyaryl groups, $(a)$ is an integer from 2 to 10, $(n)$ is an integer from 2 to 8, $(x)$ is an integer of at least 5 and $(w)$ is an integer.

8. An organosiloxane-polyoxyalkylene ether copolymer having the formula:

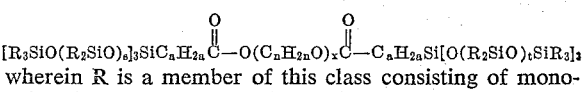

wherein R is a member of this class consisting of monovalent hydrocarbon radicals and halogenated monovalent hydrocarbon radicals, $(a)$ is an integer from 2 to 10, $(n)$ is an integer from 2 to 8, $(x)$ is an integer of at least 5 and $(s)$ and $(t)$ are integers.

9. An organosiloxane-polyoxyalkylene ether copolymer which has the formula:

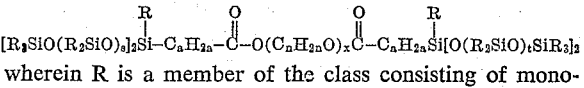

wherein R is a member of the class consisting of monovalent hydrocarbon radicals and halogenated monovalent hydrocarbon radicals, $(a)$ is an integer from 2 to 10, $(n)$ is an integer from 2 to 8, $(x)$ is an integer of at least 5 and $(s)$ and $(t)$ are integers.

10. An organosiloxane-polyoxyalkylene ether copolymer having the formula:

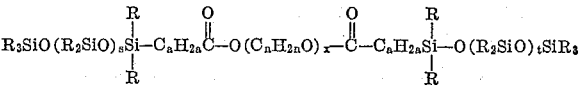

wherein R is a member of the class consisting of monovalent hydrocarbon radicals and halogenated monovalent hydrocarbon radicals, $(a)$ is an integer from 2 to 10, $(n)$ is an integer from 2 to 8, $(x)$ is an integer of at least 5, $(s)$ and $(t)$ are integers.

11. An organosiloxane-polyoxyalkylene ether copolymer of the formula:

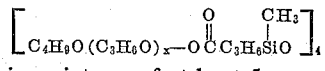

wherein $(x)$ is an integer of at least 5.

12. An organosiloxane-polyoxyalkylene ether copolymer of the formula:

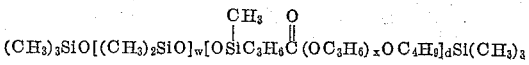

wherein $(x)$ is an integer having a value of at least 5, $(d)$ is an integer of at least 1 and $(w)$ is an integer.

13. An organosiloxane-polyoxyalkylene ether copolymer selected from the class consisting of:

(A) copolymers having the formula:

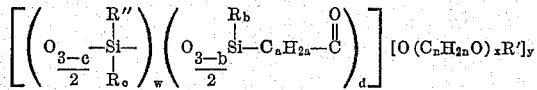

wherein R is a member of the class consisting of monovalent hydrocarbon radicals and halogenated monovalent hydrocarbon radicals, R' is a member of the class consisting of hydrogen alkyl groups, aryl groups and alkoxy alkyl groups, R" is a member of the class consisting of monovalent hydrocarbon radicals, halogenated monovalent hydrocarbon radicals, carboxyalkyl radicals, and carboalkoxyalkyl radicals, $(a)$ is an integer of from 2 to 10, $b$ is an integer of from 0 to 2, $(c)$ is an integer of from 0 to 2, $(n)$ is an integer of from 2 to 8, $(x)$ is an integer of at least 5, $d$ is an integer of at least 1, $w$ is an integer, the sum of $(d+w)$ being at least 2, and $y$ is an integer having a value equal to $(d)$ and (B) copolymers of the formula:

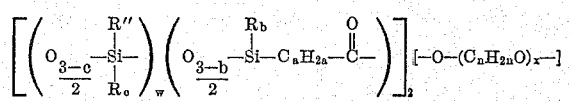

wherein R, R", $(a)$, $(b)$, $(c)$, $(n)$, $(w)$ and $(x)$ are as above-defined.

References Cited in the file of this patent
UNITED STATES PATENTS

| | | |
|---|---|---|
| 2,834,748 | Bailey et al. | May 13, 1958 |
| 2,951,861 | Kerschner et al. | Sept. 6, 1960 |
| 2,991,300 | Schmidt et al. | July 4, 1961 |